June 16, 1953 H. J. HORN ET AL 2,642,525
WAVE FORM CONVERTER
Filed April 7, 1945

Inventor
CARL M. RUSSELL
HENRY J. HORN
By Ralph L. Chappell
Attorney

Patented June 16, 1953

2,642,525

UNITED STATES PATENT OFFICE 2,642,525

WAVE FORM CONVERTER

Henry J. Horn, United States Navy, and Carl M. Russell, Washington, D. C.

Application April 7, 1945, Serial No. 587,199

5 Claims. (Cl. 250—27)

(Granted under Title 35, U. S. Code (1952), sec. 266)

This invention relates to the aural indication of recurrent impulse signals, and provides a method together with means for accomplishing the same whereby a recurrent impulse signal may be converted to a sinuous wave form suitable for aural reproduction.

Impulse type signals of a recurrent nature are employed in many applications, particularly in radio transmission. These signals comprise discrete carrier frequency wave groups having a duration of a few microseconds, and appearing at a repetition frequency normally lying within the audio band. The average power level of such a signal is so low that audible indication thereof is substantially impracticable without resorting to voltage amplitudes requiring specially designed apparatus.

It is an object of the present invention to convert the impulse type of wave form to a smoothly varying sinuous wave of greatly increased average power for application to conventional transducers.

The present invention contemplates the conversion of a recurrent impulse signal to a wave form of the pulse repetition frequency by lengthening the trailing edge of each pulse and applying this signal to a slowly responding network which lengthens its leading edge to produce an output signal having its maximum retarded in phase relatively to the impulse signal.

Other objects and advantages of the present invention will be apparent from the following detailed description taken in conjunction with the drawings wherein.

Figure 1:
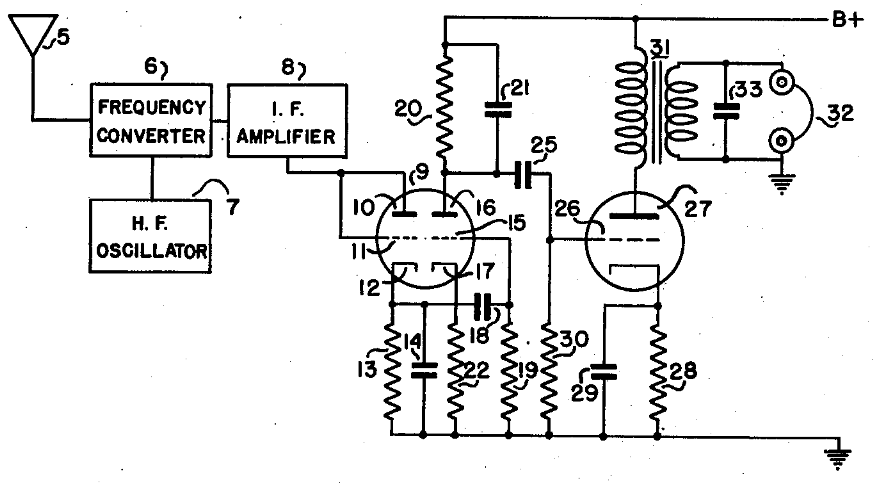
Fig. 1 is a schematic view of a circuit used in accordance with this invention.
Figure 2:
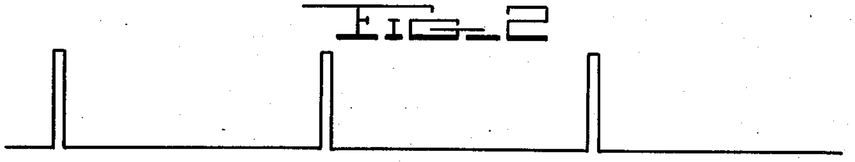
Fig. 2 is a curve of a typical pulse form.

The invention is illustrated in Fig. 1 in combination with a radio system of reception which supplies a demodulated output signal of a recurrent impulse type of wave form. In this system an antenna 5 supplies the received signal to a frequency converter 6 where it is heterodyned with the output of a local high frequency oscillator 7. The intermediate frequency from the converter 6 is fed to an amplifier 8 which in turn supplies an impulse type wave form such as is shown in Fig. 2 for application to the circuit of the present invention.

The wave form conversion circuit includes a pair of vacuum tubes shown within the single envelope 9. The first section constitutes a diode, in which control element 11 is connected directly to anode 10, and a cathode 12. The impulse type signal shown in Fig. 2 is applied directly to the anode electrode, and cathode 12 is returned to ground through resistor 13 in shunt with condenser 14. The cathode load of the input tube lengthens the trailing edge of the impulse waveform as is shown diagrammatically in Fig. 3.

This result is obtained by charging condenser 14 through a low resistance to provide a charging time constant of the same order as the impulse duration, and discharging condenser 14 through a much higher resistance to provide a discharge time constant which is long relative to the impulse. In the circuit shown, condenser 14 is charged through the low resistance unilateral impedance constituted by the diode. Condenser 14 is discharged at the termination of the pulse through resistance 13 which has a value many times that of the diode.

Figure 3:
Figs. 3, 4 and 5 are curves illustrative of potentials present at selected points during the operation of the circuit of Fig. 1.

As shown in Fig. 3, lengthening of the trailing edge of the impulse provides a signal having a much increased average power level, which is further enhanced by the operation of the second stage of the circuit.

Figure 4:
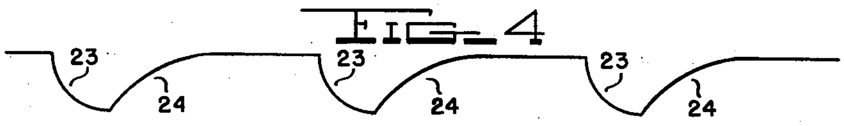

The leading edge of the converted wave form shown in Fig. 3 is then lengthened by application thereof to a slowly responding network which operates to delay the voltage maximum from the impulse phase position to a point intermediate the impulses. This produces a signal such as is shown in Fig. 4.

Lengthening of the leading edge of the impulse is obtained by operation of the second tube section included in envelope 9. In the circuit shown in the exemplary embodiment this constitutes a triode having a control element 15, an anode 16, and a cathode 17. The voltage signal shown in Fig. 3 is applied to the control element 15 through a coupling condenser 18 connected to condenser 14 in the cathode circuit of the input stage. Control element 15 is returned to ground through resistor 19.

The anode and cathode circuits of the second stage effect a delayed response of anode 16 to the control signal introduced thereto. For this purpose, condenser 21 is connected between anode 16 and the positive voltage supply, in shunt with load resistor 20. The response obtained at anode 16 of the triode section under application of the control voltage shown in Fig. 3 to grid 15 is determined by the charging and discharging time constants of condenser 21.

Cathode 17 of the triode is returned to ground through a series resistance 22. This resistance is not bypassed, and thereby provides a current feedback in this stage which produces a high anode impedance in the triode. Under quiescent conditions, the tube runs at a low current level due to the bias set up through resistance 22. When the sharp leading edge of the signal shown in Fig. 3 is applied to grid 15, the voltage at anode 16 decreases in accordance with the value of condenser 21 and the anode impedance of the triode. This time constant is selected as a multiple of the impulse duration, and constitutes a substantial fraction of the recovery time of the input stage.

The action of the anode load circuit delays the anode response to the signal shown in Fig. 3 from what would be obtained on the anode with a steady state response to the corresponding control potentials. The anode potential drops progressively as is shown at 23 in Fig. 4, and continues to decrease until the control voltage, subsiding along the trailing edge of the wave form shown in Fig. 3, decreases to a value corresponding to a control voltage for the then-obtaining anode potential in a steady state condition.

From this point the anode potential rises as is shown in 24 of Fig. 4. This rise is also exponential, and is determined by the time constant of condenser 14 and resistor 13, or that of condenser 21 and resistor 20, depending on which time constant is the greater.

It will be seen with reference to Figs. 2, 3, and 4 that the ratio of the effective value of the signal wave form to its peak value has been greatly increased with a corresponding increase in the power level.

Figure 5:
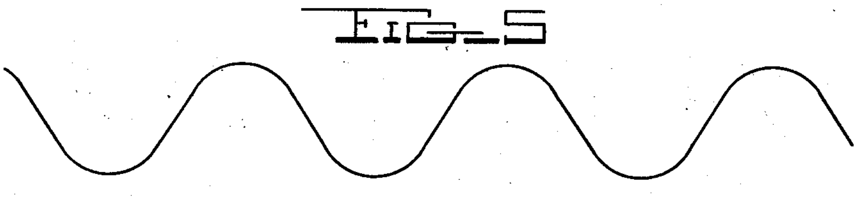

The output signal from anode 16 is coupled through a condenser 25 to control element 26 of an output tube 27. In the circuit shown the output stage comprises a triode which operates as a class A amplifier. Control element 26 is returned to ground through resistance 30 and an operating bias is obtained by cathode resistor 28, bypassed with condenser 29. The output signal is taken off through coupling transformer 31 for application to transducer 32. The output circuit is shunted with condenser 33 for removing higher harmonics present, so that the output voltage has a relatively smooth and sinuous wave form such as is shown diagrammatically in Fig. 5.

While but one embodiment of this invention has been shown and described, it will be understood that many changes and modifications may be made therein without departing from the spirit or scope of the present invention.

The invention described herein may be manufactured and used by or for the Government of the United States of America for governmental purposes without the payment of any royalties thereon or therefor.

We claim:

1. A waveform conversion circuit for deriving a sinuous signal from a recurrent impulse voltage signal comprising a unilateral impedance, a first load circuit charged through said impedance and having a high discharge time constant, means for applying a recurrent impulse signal to the impedance, a vacuum tube including a control grid, a second load circuit associated with said tube having a long response time constant and means for applying voltage developed across the first load circuit to the control grid of the tube.

2. In a waveform conversion circuit, a unilateral impedance, a load circuit associated with said impedance having a high discharge time constant, a vacuum tube including a cathode, a grid and a plate, a plate load circuit for said tube having a high response time constant, means for applying a pulse through said unilateral impedance to said first load circuit, means connecting said load circuit to said grid, and transducing means fed from said load circuit.

3. A waveform conversion circuit for deriving a sinuous signal from a recurrent impulse voltage signal comprising a unilateral impedance, a load circuit for said impedance having a high discharge time constant, means for applying a recurrent impulse signal to said impedance, a vacuum tube having a control electrode, an anode and a cathode, a load circuit for said anode having a high response time constant, said control electrode being connected to said impedance load, an amplifier, and means for utilizing the variations in anode voltage to control the output of said amplifier.

4. A wave form conversion circuit for deriving a sinuous signal from a recurrent impulse voltage signal comprising a vacuum tube having a cathode, an anode, and a control electrode interposed therebetween, a load circuit associated with said anode having a high response time constant, a unilateral impedance, a load circuit having a high discharge time constant whereby the leading edge of said pulse is applied without substantial change to said electrode but the trailing edge of said pulse is substantially delayed, means for applying a recurrent impulse through said impedance to said control electrode, an amplifier and means for utilizing the variations in anode voltage to control the output of said amplifier.

5. A waveform conversion circuit for deriving a sinuous signal from a recurrent impulse voltage signal comprising a vacuum tube having a cathode, an anode, and a control electrode interposed therebetween, a load circuit associated with said anode having a high time constant, a unilateral impedance, a load circuit having a high discharge time constant associated with said impedance whereby the leading edge of said impulse is applied without substantial change to said control electrode but the trailing edge of said pulse is substantially delayed, means for applying a recurrent impulse signal to the impedance, means for connecting the load circuit of said unilateral impedance to the control electrode, an amplifier circuit, means for utilizing the variations in anode voltage to control the output of said amplifier, and a coupling device in the output of said amplifier for removing harmonics of the fundamental recurrence rate of said impulse.

HENRY J. HORN.
CARL M. RUSSELL.

References Cited in the file of this patent

UNITED STATES PATENTS

| Number | Name | Date |
|---|---|---|
| 1,656,888 | Hazeltine | Jan. 17, 1928 |
| 2,222,172 | Dimmick | Nov. 19, 1940 |